June 18, 1935. E. S. D. VON SEGEBADEN 2,005,280
DEVICE FOR CONTINUOUS COMPRESSING AND DRYING OF CIGAR BUNCHES
Filed Jan. 28, 1932
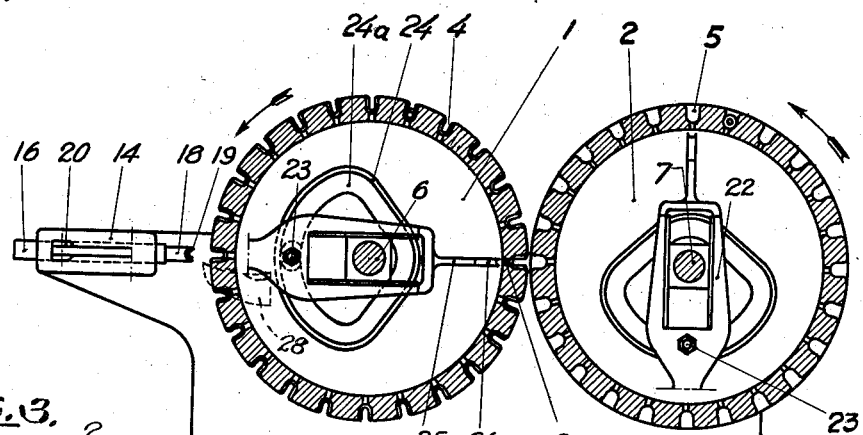
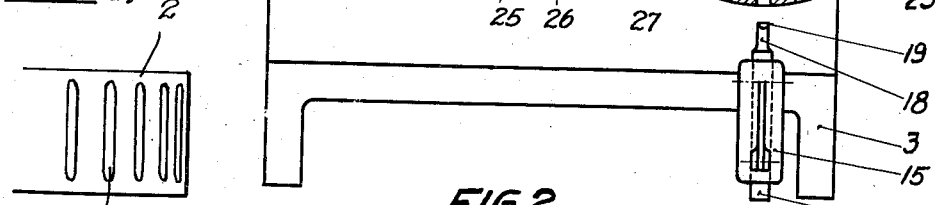
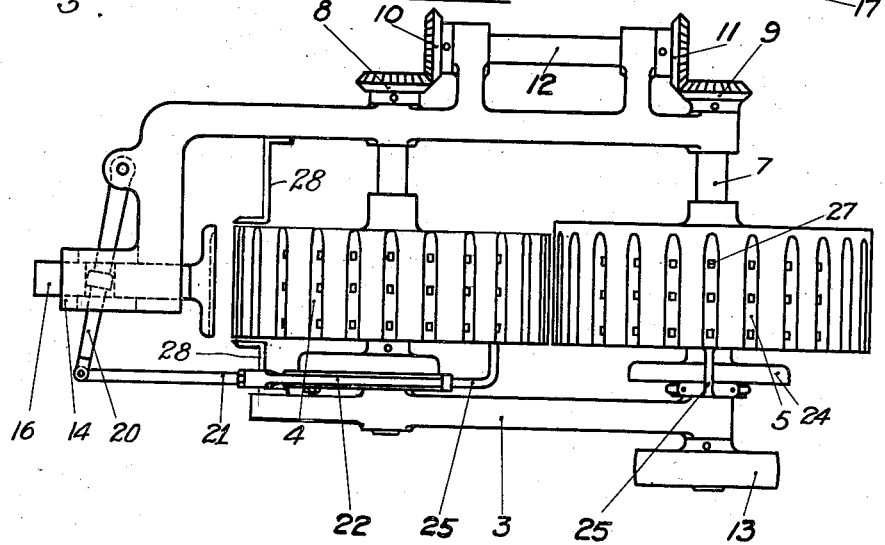
Inventor
Ernst S. D. von Segebaden
By Sommers & Young
Attys.

Patented June 18, 1935

2,005,280

UNITED STATES PATENT OFFICE 2,005,280

DEVICE FOR CONTINUOUS COMPRESSING AND DRYING OF CIGAR BUNCHES

Ernst Sigurd Detlof von Segebaden, Stockholm, Sweden, assignor to Aktiebolaget Formator, Stockholm, Sweden, a joint-stock company of Sweden Application January 28, 1932, Serial No. 589,496

11 Claims. (Cl. 131—9)

The present invention relates to improvements in such devices for the compressing and drying of bunches as described and claimed in the application Serial No. 126,074 filed July 30, 1926.

The invention has for its object to obtain bunches, which in their shape thoroughly correspond to that of the finished cigar.

The device according to the invention, which contains carriers for the pressing and drying of the bunches, is arranged in the way that the bunch, which in the way specified in the application No. 126,074 is pressed in the carriers and mechanically transferred from one carrier to another carrier, is first placed by hand in a carrier with moulds open at both ends, after which the bunch is automatically transferred to another carrier or a series of carriers at the moulds of which are provided certain hereinafter specified means for forming the bunch so that its shape corresponds to the shape of the finished cigar.

On account of the first carrier being developed in said manner the advantage is gained that the bunch without difficulties, i. e. without loss of time, can be placed in the moulds. The velocity of the following automatic transfer to a mould of more exact shape (closed at one end or both ends) of course is quite independent of the shape of the mould.

A preferred embodiment of the invention is shown in the accompanying drawing.

Fig. 1 shows a side elevation and partly cross section of a device according to the invention and Fig. 2 shows a horizontal top view of the same device.

Fig. 3 shows part of a modified embodiment of the invention.

Two carriers in the shape of drums 1 and 2 are parallelly arranged on a frame 3 and connected with the driving device so that they can be brought into stepwise rotation in the directions of the arrows. Each step thereby corresponds to the distance between two moulds, which moulds are arranged at equal intervals at the circumference of the drums. The moulds 4 in drum 1 are open at both ends whereas the moulds 5 in drum 2 are according to Fig. 3, closed at one end and have the shape that the finished cigar shall have.

The drums 1 and 2 are rotatably journaled on shafts 6 and 7 respectively which in their turn are rotatably journaled in the frame 3 and at their one, free end provided with bevel gears 8 and 9 respectively. These gears intermesh with other equally bevelled gears 10 and 11 respectively, arranged on a shaft 12, which thus connects shafts 6 and 7 with each other. On shaft 7 is mounted a driving pulley 13. Knives 28 are arranged at the faces of drum 1 to cut off bunch clippings projecting beyond the moulds 4.

The frame 3 forms two guides 14 and 15 for reciprocating slides 16 and 17 forming at one end a die 18 co-operating with the moulds in the corresponding drums 1 and 2. The guide 14 for the slide 16 co-operating with the drum 1 is located in a plane intersecting the two shafts 6 and 7, whereas the guide for the second slide 17 is located in a plane at right angles to said first mentioned plane. The dies 18 are provided at their free ends with a recess or pocket 19 corresponding to the moulds of the drums 1 and 2 so that when the die moves into a pocket 4 or 5 there will be formed a space or chamber the shape and size of which corresponds exactly to the cigar to be made.

The movement of the slides 16 and 17 is performed by means of levers 20 pivoted on the frame. Said levers 20 obtain a reciprocating swinging motion by means of a rod 21, a forked member 22 secured thereto and a roller mounted on a journal 23 of the member 22 and running in a curved slot 24a of a disc 24 secured to the shafts 6 and 7 respectively. Arms 25 rigidly secured to the forked members 22 extend axially into the drums 1 and 2 and are provided with pusher-out pins 26 fitting to apertures 27 in the bottom of the moulds in the drums, so that at each moving of the members 22 to the right respectively upwardly the pins 26 will enter into the apertures 27 and push out the bunch lying in the corresponding mould.

It is obvious that the device illustrated in the drawing constitutes a special form of execution of the inventive idea underlying this application and that any other form of execution might have been chosen for the purpose. Thus the moulds of the drum 2, as illustrated in Fig. 3, may be closed at both ends, said ends having the same shape as the finished cigar. It is also possible to replace the parallel rotating drum by other carriers of any shape and provided with moulds according to the invention.

What I claim is:—

1. In a machine for forming bunches in manufacturing cigars in combination a primary movable endless carrier having pockets open at both ends, a second movable carrier having pockets, means for automatically transmitting the bunches from pockets of the primary carrier to pockets of the second carrier and means for imparting to the head of the bunches in the pockets of the second carrier a shape corresponding to that of the uncut finished cigar.

2. In a machine for forming bunches in manufacturing cigars in combination primary movable endless carriers having pockets open at their ends, a final movable carrier having pockets, means for automatically transmitting the bunches from pockets of a primary carrier to pockets of the final carrier and means for imparting to the head of the bunches in the pockets of the final carrier a shape corresponding to that of the uncut finished cigar.

3. In a machine for forming bunches in manufacturing cigars in combination a primary movable endless carrier having pockets open at both ends, members for cutting off bunch clippings that extend beyond said pockets, a second movable carrier having pockets, means for automatically transmitting the bunches from pockets of the primary carrier to pockets of the second carrier and means for imparting to the head of the bunches in the pockets of the second carrier a shape corresponding to that of the uncut finished cigar.

4. In a machine for forming bunches in manufacturing cigars in combination a primary movable endless carrier having pockets open at both ends, a second movable carrier having pockets closed at one end and means for automatically transmitting the bunches from pockets of the primary carrier to pockets of the second carrier.

5. In a machine for forming bunches in manufacturing cigars in combination a primary movable endless carrier having pockets open at both ends, a second movable carrier having pockets closed at both ends and means for automatically transmitting the bunches from pockets of the primary carrier to pockets of the second carrier.

6. In a machine for forming bunches in manufacturing cigars in combination a primary movable endless carrier having pockets open at both ends a second movable carrier having pockets closed at an end and means for automatically transmitting the bunches from pockets of the primary carrier to pockets of the second carrier, the closed pockets being parallel with the open pockets, the closed ends of the pockets extending somewhat beyond the ends of the open pockets.

7. In a machine for forming bunches in manufacturing cigars in combination a primary movable endless carrier having pockets open at both ends, a second movable carrier having pockets, means for automatically transmitting the bunches from pockets of the primary carrier to pockets of the second carrier and dies for imparting to the head of the bunches a shape corresponding to that of the finished cigar and means for imparting to said dies movements into the pockets of the second carrier.

8. In a machine for forming bunches in manufacturing cigars, in combination a primary movable carrier having a plurality of pockets open at both ends, a second movable carrier having pockets closed at one end, and means for automatically transmitting the bunches from pockets of the primary carrier to pockets of the second carrier.

9. In a machine for forming bunches in manufacturing cigars, in combination a primary movable carrier having a plurality of pockets open at both ends, a second movable carrier having pockets closed at both ends, and means for automatically transmitting the bunches from pockets of the primary carrier to pockets of the second carrier.

10. In a machine for forming bunches in manufacturing cigars, in combination a movable drum having pockets open at both ends, a movable carrier having pockets closed at one end, and means for automatically transmitting the bunches from pockets of said drum to pockets of said carrier.

11. In a machine for forming bunches in manufacturing cigars, in combination a movable drum having pockets open at both ends, a movable carrier having pockets closed at both ends, and means for automatically transmitting the bunches from pockets of said drum to pockets of said carrier.

ERNST SIGURD DETLOF von SEGEBADEN.